D. L. JOHNSON.
Mill-Feed Regulator.
No. 82,958.
Patented Oct. 13, 1868.
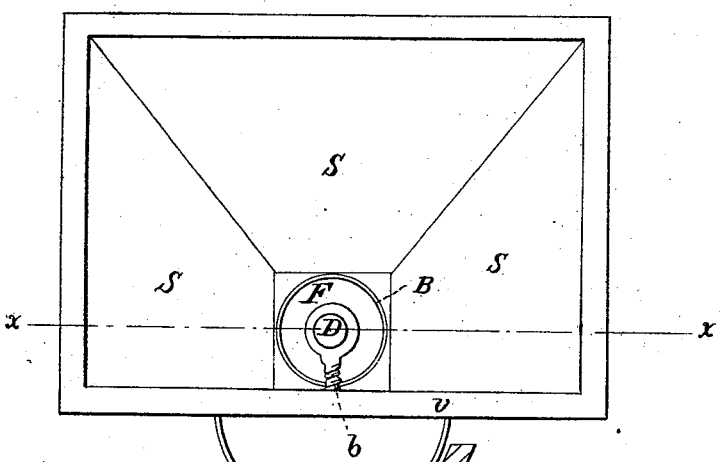
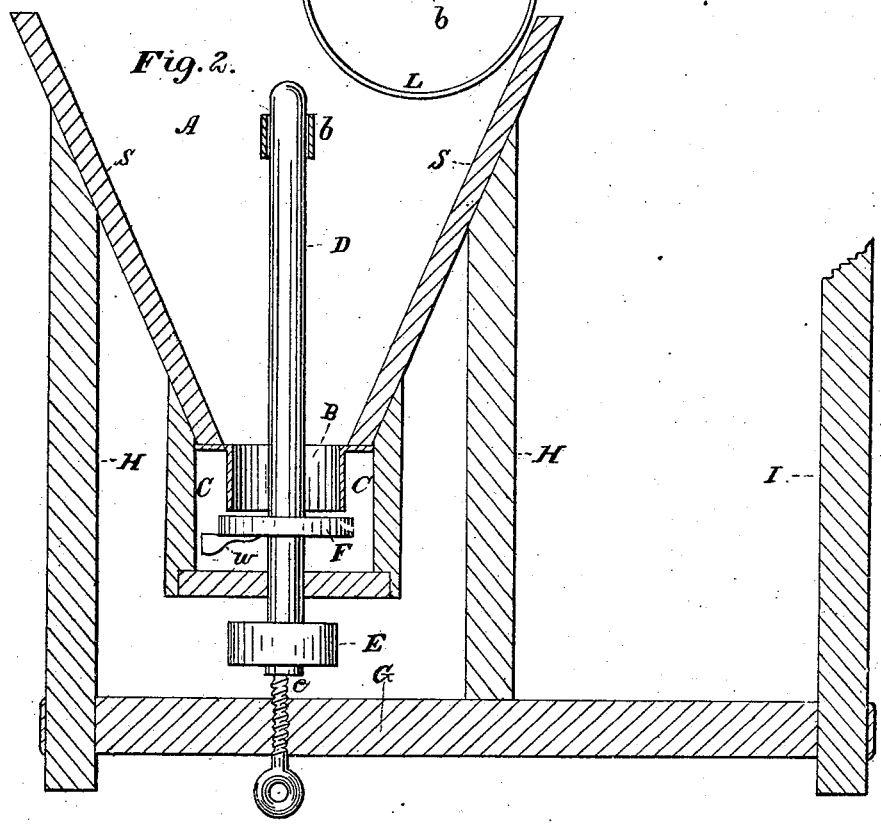
Witnesses:
Inventor:

DANIEL L. JOHNSON, OF YORKVILLE, MICHIGAN.

Letters Patent No. 82,958, dated October 13, 1868.

IMPROVED FLOUR-DISPENSER.

The Schedule referred to in these Letters Patent and making part of the same.

*To all whom it may concern:*

Be it known that I, DANIEL L. JOHNSON, of Yorkville, in the county of Kalamazoo, and State of Michigan, have invented a new and useful Machine, which I denominate "A Flour-Dispenser," for the purpose of dispensing any relative proportioned quantity of an inferior grade of flour to be mixed with a superior grade, during the process of manufacture, or *vice versa;* and I do hereby declare that the following is a full, clear, and exact description of the construction and operation of the same, reference being had to the annexed drawings, making a part of this specification, in which—

Figure 1 is a plane view.

Figure 2 is a vertical section in the line $x$.

Similar letters of reference indicate corresponding parts in both figures.

The nature and object of my invention are the providing a simple and effective mode of dispensing from a bin or hopper, in which flour of an inferior or superior grade is stored, and conveying a regular and uninterrupted supply of such flour, in any required proportion, as experience may determine, to the coolers, to be thoroughly mixed and incorporated with the meal from the stones, of a superior or inferior grade, as the case may be, and thereby produce, at pleasure, without disarrangement of the ordinary routine, special grades of flour not hitherto known or made.

My mode of dispensing flour to be mixed as and for the purpose aforesaid is, to pass it through a hopper, A, part of the sides being angular and part vertical, so as to best destroy the equality of the pressure of the flour against said sides. In the drawing, one of the sides only is represented as vertical, and I find this to operate well in practice.

I make the angular sides, $s$, of the hopper to converge at the bottom, so as to leave a proper-sized aperture, over which a short open discharge-tube, B, is connected by means of its flange, said tube and a proper space below it being enclosed by a casing, C, which is open on one side.

D represents a straight, smooth spindle, usually of iron, which I hang vertically inside of the tube and casing aforesaid, so as to leave a sufficient annular space for the passage of the flour. The upper end of the spindle passes up some distance in the hopper, and is hung in a bearing, $b$, attached to its vertical side $v$, and the lower end passes through the bottom of the casing C, and is stepped upon the end of an adjustable set-bolt, $e$, screwed through the girt G of the hangers H, the whole being steadied and connected to any convenient part of the building by means of a bracket, I, or in any other suitable and convenient manner.

The spindle D carries a driving-pulley, E, for its rotation by means of a belt, (not shown,) and I hang a disk, F, on the spindle, inside of the casing aforesaid, and immediately under the tube B, said disk being a little larger in diameter than the tube, so as to overlap it, and provided with one or more wings, as at $w$.

L represents a guard, which is simply a strip of sheet-metal, bent in a semicircle, and attached to the casing C, in front of its open side.

The mode of operation is as follows:

The feed being adjusted by screwing or unscrewing the bolt $e$, on which the spindle is stepped, and thereby causing the disk to approach or recede from the lower end of the tube B, and the spindle revolved by a belt or otherwise, a stream of flour from the hopper will pass down on the vertical side, and be thrown out by the centrifugal action of the revolving disk into the open-sided casing, when the disk-wing or wings, $w$, will project it through the open side against the guard-plate L, when it will fall into conveyers, elevators, or spouts, to be placed for its reception, and carried and discharged into the coolers, and thoroughly incorporated with the newly-ground meal in such relative proportion as may be desired for the special grade of flour intended.

The mixing of flour of a certain grade, in any defined proportion, with other flour of a different grade during the process of manufacture, in order to supply to that flour some component part in which it is deficient, or to reduce it if in excess, has not hitherto been successfully accomplished, owing, probably, to the difficulty always experienced in drawing a small, even stream of flour from a large body of it stored in one receptacle.

In my arrangement of the hopper with a vertical side, in connection with the rapidly-revolving winged disk and side issue, a steady and even stream of flour can be delivered without interruption by choking, so as to mix fairly in any required proportion without change or disturbance of the regular work of the mill.

I claim the construction and arrangement of the hopper A, tube B, and vertically-adjustable spindle D, having disk F and wing $w$ attached thereto, with the casing C and guard L, all combined and operated substantially in the manner and for the purposes set forth.

DANIEL L. JOHNSON.

Witnesses:
PETER HOPPEL,
ASA HOAG.